(12) United States Patent
Zara et al.

(10) Patent No.: US 7,206,848 B1
(45) Date of Patent: Apr. 17, 2007

(54) INTELLIGENTLY CLASSIFYING AND HANDLING USER REQUESTS IN A DATA SERVICE SYSTEM

(75) Inventors: Anna Maria Zara, Menlo Park, CA (US); Srinivas Ramanathan, Chennai (IN); Preeti N Bhoj, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 296 days.

(21) Appl. No.: 09/666,910

(22) Filed: Sep. 21, 2000

(51) Int. Cl.
G06F 15/16 (2006.01)
G06F 7/00 (2006.01)
G06F 17/30 (2006.01)

(52) U.S. Cl. .......................... 709/229; 707/9
(58) Field of Classification Search ............... 705/1, 705/7, 8, 500, 2, 3, 4, 26, 27, 37, 400, 9; 709/207, 228, 226, 240, 102, 103, 100, 101, 709/104, 105, 106, 225, 229, 232, 233, 235, 709/238, 239, 250, 1, 227; 707/1, 2, 3, 5, 707/6, 7, 9, 10, 104.1, 4, 100, 104.5; 718/102, 718/103, 104, 105; 370/395.42, 395.43, 370/431
See application file for complete search history.

(56) References Cited

U.S. PATENT DOCUMENTS

| 5,603,029 | A | | 2/1997 | Aman et al. |
| 5,875,296 | A | * | 2/1999 | Shi et al. ..................... 713/202 |
| 5,878,215 | A | * | 3/1999 | Kling et al. .................... 705/8 |
| 5,946,498 | A | * | 8/1999 | Chiang et al. ............... 395/874 |
| 5,956,688 | A | * | 9/1999 | Kokubo et al. ................. 705/1 |
| 5,956,752 | A | * | 9/1999 | Mathews ...................... 711/204 |
| 5,960,404 | A | * | 9/1999 | Chaar et al. .................... 705/8 |
| 6,006,264 | A | | 12/1999 | Colby et al. |

(Continued)

FOREIGN PATENT DOCUMENTS

EP  0 735 482 A1 * 10/1996

OTHER PUBLICATIONS

Braden et al. RFC 1636—Report of IAB Workshop on Security in the Internet Architecture—Feb. 8-10, 1994.*

(Continued)

*Primary Examiner*—Igor N. Borissov
(74) *Attorney, Agent, or Firm*—Richard P. Lange (57) ABSTRACT

A data service system includes a server system. The server system includes a request processor that schedules external requests to be serviced by the server system based on classification information contained in a tag of each of the requests. An application system is coupled to the server system. The application system includes an application engine that performs a transaction requested by an external request and provides response to the request to the server system. The application system also includes a business rule engine that stores business rules regarding classification for various transactions. The business rule engine also uses the business rules to analyze the response to the request. A tag generator is provided in the application system that generates the tag based on the analysis of the business rule engine. The tag is then attached to the response by the server system and sent to a requesting client that issued the request such that the tag is attached to subsequent requests from the requesting client to the data service system. A method of intelligently classifying requests is also described.

19 Claims, 4 Drawing Sheets

U.S. PATENT DOCUMENTS

| | | | |
|---|---|---|---|
| 6,055,564 A * | 4/2000 | Phaal | 709/207 |
| 6,076,108 A * | 6/2000 | Courts et al. | 709/227 |
| 6,154,769 A * | 11/2000 | Cherkasova et al. | 709/207 |
| 6,249,800 B1 * | 6/2001 | Aman et al. | 718/105 |
| 6,338,064 B1 * | 1/2002 | Ault et al. | 707/9 |
| 6,341,369 B1 * | 1/2002 | Degenaro et al. | 717/1 |
| 6,374,300 B2 * | 4/2002 | Masters | 709/229 |
| 6,434,559 B1 * | 8/2002 | Lundberg et al. | 707/7 |
| 6,463,447 B2 * | 10/2002 | Marks et al. | 707/513 |
| 6,584,454 B1 * | 6/2003 | Hummel et al. | 705/59 |
| 6,728,748 B1 * | 4/2004 | Mangipudi et al. | 718/105 |
| 6,742,016 B1 * | 5/2004 | Bhoj et al. | 709/207 |
| 6,772,225 B1 * | 8/2004 | Jennings et al. | 709/240 |
| 6,789,125 B1 * | 9/2004 | Aviani et al. | 709/238 |

OTHER PUBLICATIONS

Liebmann L, Load Balancing: Where the Action IsNetwork Magazine, CMP Media, New York, NY, US, vol. 15, No. 3, Mar. 2000 XP000919503, pp. 60-64.

Network-Based Application Recognition (Cisco NBAR), CISCO White paper, 1999 XP002261077, pp. 1-6.

* cited by examiner

INTELLIGENTLY CLASSIFYING AND HANDLING USER REQUESTS IN A DATA SERVICE SYSTEM

BACKGROUND OF THE INVENTION

1. Field of the Invention

The present invention pertains to the Internet. More particularly, this invention relates to intelligently classifying and handling user requests in a data service system.

2. Description of the Related Art

Figure 1:
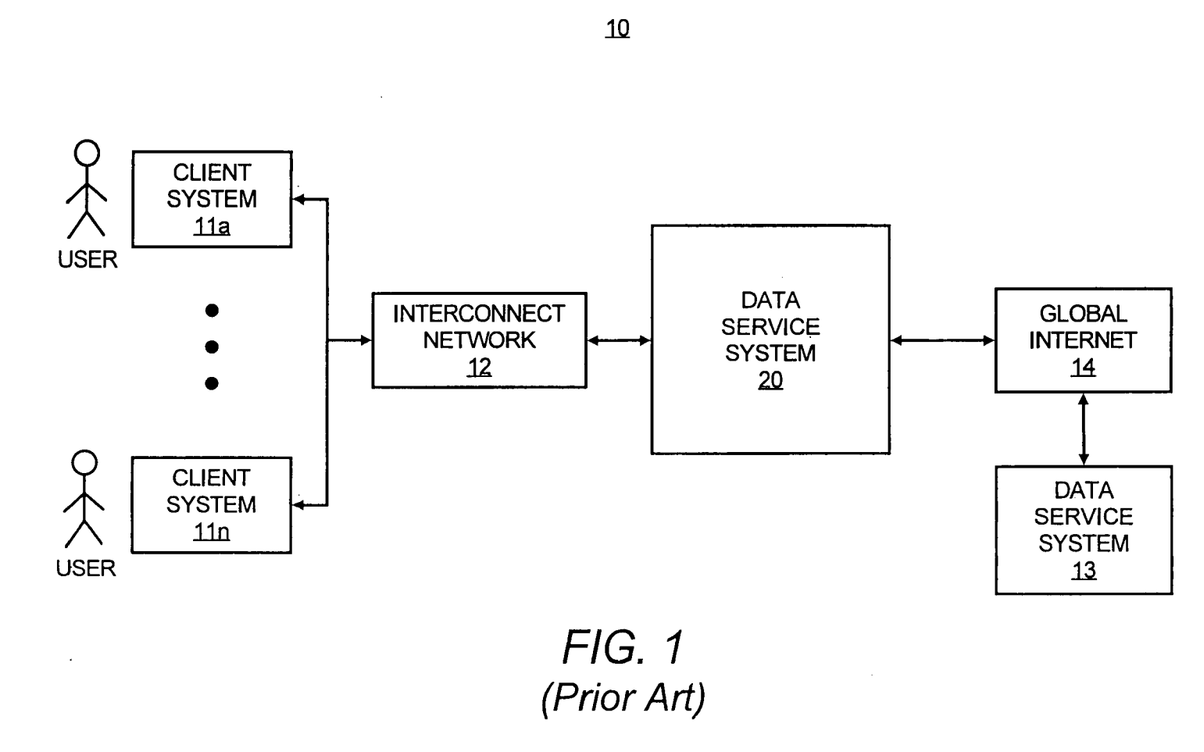
FIG. 1 schematically shows the overall structure of the Internet.

With the rapid growth of the Internet, more and more business and residential users are beginning to rely on the Internet for their mainstream and mission-critical activities. As is known, the Internet typically refers to a number of data service systems connected together via a high speed interconnect network (see FIG. 1). Each data service system (e.g., the data service system 13 or 20 in FIG. 1) typically includes Internet server applications that host contents for various customers. Remote client systems (e.g., the client systems 11a–11n in FIG. 1) may be connected to a data service system (e.g., the data service system 20 in FIG. 1) via an interconnect network. Each client system is equipped with a web browser (or other software such as an e-mail software) that allows its user (i.e., a person) to access the contents and/or applications hosted in various data service systems through the corresponding client system.

Popular Internet applications include World Wide Web (WWW), E-mail, news, and FTP applications. All of these applications follow the client-server model and rely on the Transmission Control Protocol (TCP) for reliable delivery of information/applications between severs and client systems. These applications can also be referred to as server applications. A user can access a server application (e.g., web server) by generating at least one request from a corresponding client system to the corresponding server application. The server application then services the request. A server application can be accessed by multiple client systems at the same time. The server application typically serves the user requests in the first-in-first-out (FIFO) fashion.

One problem of the above-identified prior art server application is that it does not have protection mechanism against excessive load conditions. Unbearably long delays may occur when the total number of user requests received by the server application at one time greatly exceeds the total number of access requests permitted by the server application (i.e., the entire system is overloaded).

Another problem is that the server application does not provide predictable performance or predictable response to its customers that host their content/service sites in the server application. This means that the prior art server application does not provide features like performance stability over a range of client demands, non-interference performance among co-hosted content sites, targeted performance, and overload protection for the hosted content sites.

To overcome these problems, prior proposals have been made to add quality-of-service (QoS) middleware in the server application. The QoS middleware classifies requests into different classes. For example, the QoS middleware classifies a request as an existing session request if the incoming request is part of an existing session. If the incoming request is not part of an existing session, then the middleware can classify the request as a new session request. Furthermore, the above described prior solution can also be realized by hardware load balancers (e.g., products from Foundry Networks, Inc. Alteon Systems, Inc.) can also be employed.

Disadvantages are, however, still associated with this prior approach. One disadvantage is that the classification is very inflexible and is done in a rather mechanical way. For example, if used for on-line transactions, the above-mentioned prior art middleware does not take into account the type of transaction (e.g., the amount of money involved) of each request. As is known, a one-million-dollar transaction should be treated with a higher priority than a ten-thousand dollar transaction. The prior art middleware provides the same treatment to all requests within the same class, regardless of the transaction type of each request. If the middleware needs to send a request from the existing session class to the server application, the middleware will only pick one request from the existing session queue based on the FIFO order. Similarly, if the middleware needs to send a request from the new session class to the server application, the middleware will only pick one request from the corresponding queue based on the FIFO order.

SUMMARY OF THE INVENTION

One feature of the present invention is to improve performance of a data service system.

Another feature of the present invention is to provide a data service system that intelligently and dynamically classifies and handles user requests to the data service system.

A further feature of the present invention is to provide a data service system that dynamically and specifically classifies each user request to the data service system based on specific business rules.

A data service system includes a front-end server system. The server system includes a request processor that schedules external user requests to be serviced by the server system based on classification information contained in a tag of each of the requests. An application system is coupled to the server system. The application system includes an application engine that performs a transaction requested by an external request and provides response to the request to the server system. The application system also includes a business rule engine that stores business rules regarding classification for various transactions. The business rule engine also uses the business rules to analyze the response to the request. A tag generator is provided in the application system that generates the tag based on the analysis of the business rule engine. The tag is then attached to the response by the server system and sent to a requesting client that issued the request such that the tag is attached to subsequent requests from the requesting client to the data service system.

In addition, a method of intelligently classifying access requests is also described. The method uses business rules for classification of various transactions stored in a business rule engine to analyze the response to an access request received in an application system coupled to a front-end server system. The access request is requesting the application system to perform a transaction and generate a response for the request. The analysis of the response using the business rules produces the classification information of the transaction. A tag containing the classification information is generated and sent to a requesting client that issued the request. This allows the tag to be attached to subsequent requests from the requesting client to the data service system for the same transaction. Requests in the server system are scheduled to be serviced based on the classification information contained in the tag of each of the requests.

Other features and advantages of the present invention will become apparent from the following detailed description, taken in conjunction with the accompanying drawings, illustrating by way of example the principles of the invention.

DETAILED DESCRIPTION OF THE INVENTION

Figure 2:
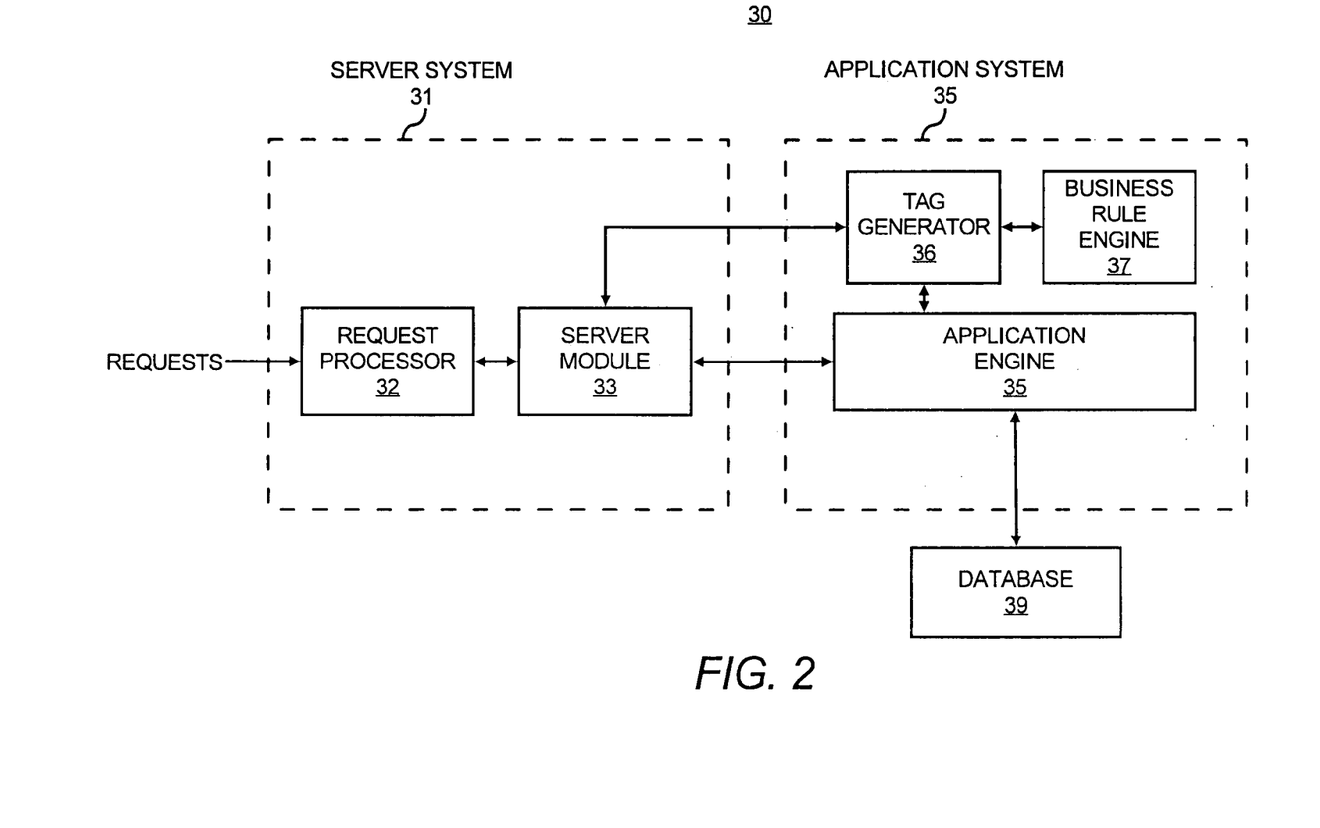
FIG. 2 shows the structure of a multi-tier data service system that implements one embodiment of the present invention, wherein the multi-tier data service system includes a server system and an application system having a tag generator and a business rule engine.

FIG. 2 shows a multi-tier data service system 30 that implements one embodiment of the present invention, which will be described in more detail below. As can be seen from FIG. 2, the data service system 30 includes a front-end server system 31, an application system 35, and a database 39.

To summarize the essence of the present invention, the server system 31 includes a request processor 32 that schedules external requests to be serviced by a server module 33 of the server system 31 based on the classification information contained in a tag of each request. The external requests are generated from external requesting clients (all not shown in FIG. 2). The requesting clients are connected to the server system 31 of the data service system 30 via Internet. The communication between the requesting clients and the server system 31 employs an open standard Internet communication protocol (e.g., the HTTP protocol).

The tag contained in each request is generated from the application system 35, which is coupled to the server system 31. The server module 33 includes an application system connectivity module (e.g., plug-in) (not shown in FIG. 2) that allows the server module 33 to invoke the application system 35 for a user request.

The application system 35 includes application engine 38 that performs a predetermined transaction or operation requested by the request forwarded from the server system 31. The application engine 38 also prepares a response to the request about the transaction. For example, the response may be the result of the completed transaction. The response may also ask the requesting client that generated the request for the transaction for more information to complete the transaction.

The application system 35 also includes a business rule engine 37 that stores business rules regarding classification of various transactions. The business rules may also associate priority with a specific session or user. The business rule engine 37 also uses the business rules to analyze the response of a transaction in order to obtain classification information of the transaction. The application system 35 also includes a tag generator 36 that generates the tag that contains the classification information of the transaction. The tag is then attached to the response to be sent to the corresponding requesting client. The requesting client can then attach the tag to subsequent requests to the data service system 30 for the same transaction. This allows subsequent requests from the requesting client for the same transaction not to require further classification. This also allows requests to be classified based on the nature of their respective transactions. Re-classification can be based on a user's session as well as on transaction completion. The structure and operation of the data service system 30 in accordance with one embodiment of the present invention will be described in more detail below, also in conjunction with FIGS. 2–4.

Referring to FIG. 2, the data service system 30 can be employed by an Internet Service Provider (ISP) to offer data services (e.g., web, news, advertisement, or e-mail) and/or other services (e.g., e-commerce) to users or clients connected to the data service system 30. Here, a customer means the entity contracting with the data service system 30 to have its content hosted in the data service system 30, or to have its services offered through the data service system 30. A user or client means the entity accessing the data service system 30 through a remote client system via a communication network. A user can also be referred to as a client.

The data service system 30 is implemented by or operates in a computer system (or a set of networked computer systems) with a network communication capability. For example, the data service system 30 can be implemented by or operates in a server computer system, a workstation computer system, a mainframe computer system, a notebook computer system, or any other computer system.

The data service system 30 is a multi-tier system. In one embodiment, the data service system 30 is a three tier system. In this case, the server system 31 represents the first tier while the application system 35 represents the second tier and the database 39 represents the third tier, as can be seen from FIG. 2. Alternatively, the tiers of the data service system 30 can be more or fewer than three. The multi-tier structure of the data service system 30 is partially due to the fact that the use of the World Wide Web has expanded to include other applications (e.g., e-commerce applications or database access applications). The database 39 at the back-end of the data service system 30 serves as the repository of the data service system 30. When the server system 31 needs to access the database 39, the application system 35 is used to offer high level abstractions for database accesses. This makes it easier to write applications that also offer more functions and higher performance. As is known, some e-commerce transactions involve complicated calculation and frequent database accesses. In addition, the database 39 may also include applications. For example, when a customer orders products on-line, the application system 35 will use a connectivity module (not shown in FIG. 2) to run transactions in a legacy ordering application program in the database 39. It is that ordering application program that will make the actual database queries and updates.

As can be seen from FIG. 2, the application system 35 is operatively connected to the server system 31. The server system 31 functions as a front-end for application services provided by the application system 35 that users or clients access. Communication between the server system 31 and the application system 35 can be accomplished either via the CGI (Common Gateway Interface) interface or via a plug-in application that operates in the same process space as the server process.

The application system 35 is then operatively connected to the database 39, which serves as the last tier of the multi-tier structure of the data service system 30. The database 39 serves as the repository of the data service system 30. The database 39 stores information (e.g., product catalogs, reservation tables, product order forms) being accessed by external users or clients.

The server system 31 can be any TCP/IP-based server application system. A TCP/IP-based server application is a connection-based client-server. This means that the server system 31 can be used as a web server, an e-mail server, a news server, an e-commerce server, a proxy server, a domain name server, or a local service server. In the following description, the server system 31 will be described as a web server system.

The server system 31 includes the request processor 32 and the server module 33. The structure of the server module 33 is dependent on the type of server it implements. For example, if the server system 31 is a web server, the server module 33 performs the web server function which may include hosting web content and processing requests to retrieve their web pages. The server module 33 is implemented using any known technology. The server module 33 can handle multiple access requests at the same time.

The server module 33 receives and handles access requests to the server system 31 from various clients or client systems via the Internet (all not shown in FIG. 2). This means that an open standard transmission protocol is used to transmit the access requests. In one embodiment, the open standard communication protocol is the HTTP (Hyper Text Transport Protocol) protocol. Alternatively, other open standard communication protocols may be used.

An access request to the data service system 30 includes the URL address of the data service system 30. The URL address helps direct the access request to the server system 31 via Internet. The request also includes the IP (Internet Protocol) address of the client that generates the access request. The IP address uniquely identifies the origin of the request. This means that the IP address identifies from which user or client system the access request is generated. The access request also includes arguments and/or parameters that specify what response the server system 31 should provide or generate to the access request. In addition, the access request also includes other data items (e.g., tags and cookies) that will be described in more detail below.

The server module 33 may include a server engine and a content generator (both not shown in FIG. 2). The server engine of the server module 33 receives and handles access requests received in the server module 33. The request handling functions of the engine are known and will not be described in more detail below.

When the engine of the server module 33 receives a request, it first determines whether the request can be serviced by the content generator of the server module 33 or not. If the request only requests services of the content generator of the server module 33, then the engine passes the request to the content generator of the server module 33 and receives a response to the corresponding request. The engine then sends the response back to the respective requesting client system.

The content generator of the server module 33 is used to generate content as requested by the access request. The content generator of the server module 33 is also implemented using known technology. The content generator of the server module 33 may store a number of content files for access by the access requests. The content files may be static or dynamic content files. The content files may also be executable programs/codes (typically in the form of CGI scripts or plug-ins).

If the engine of the server module 33 determines that request is requesting services of the application system 35, the server module 33 sends the request to the application system 35. This is done through one of several defined interface mechanisms (e.g., CGI, plug-in). The engine receives the response to the request from the application system 35. The engine then sends the response back to the requesting client system.

When access requests are received in the server system, the request processor 32 first processes the access requests before they are serviced by the server module 33. The processing functions of the request processor 32 include classifying the access or user requests as to their processing priority and scheduling the requests to be serviced by the server module 33 according to the priority classification of the requests. In accordance with one embodiment of the present invention, the request processor 32 performs the priority classification function by only taking the classification information contained in a tag attached to the request. This means that an access request also contains a tag in the parameters of the request. The tag contains classification information of the corresponding request.

In one embodiment, the priority classification of a request can be Low (represented by "1"), Medium (represented by "2"), and High (represented by "3"). Alternatively, more classification levels can be used to classify a request. In one embodiment, the tag that contains the priority classification information of the request is encoded into the parameters of the request. In another embodiment, the tag can be placed in a cookie which is then attached to the request. The following shows an exemplary access request that contains the tag.

http://spacepg1/cgibin/oexress/bw_login.jsp?
BVSessionID=@@@1234_BVSessionStart
s9103435656@@&BV_EngineID=ccca234545&
BVSessionLastAccess=95667778&HP WebQoSClass=3.

Here, the information after the symbol "?" is parameters for the request and the data field "HPWebQoSClass=3" within the parameters contains the classification tag of the request. With this information, the request processor 32 of FIG. 2 can determine the classification of the corresponding request. Here in this case, since the value of the "HPWebQoSClass" field is three (i.e., High), the request processor 32 classifies the request as high and schedules the request for service accordingly. If a request does not contain such a tag with classification information, then the request processor 32 assigns a default tag with a predetermined classification information to the request. This unique request classification function of the request processor 32 will be described in more detail below, also in conjunction with FIG. 4.

Figure 4:
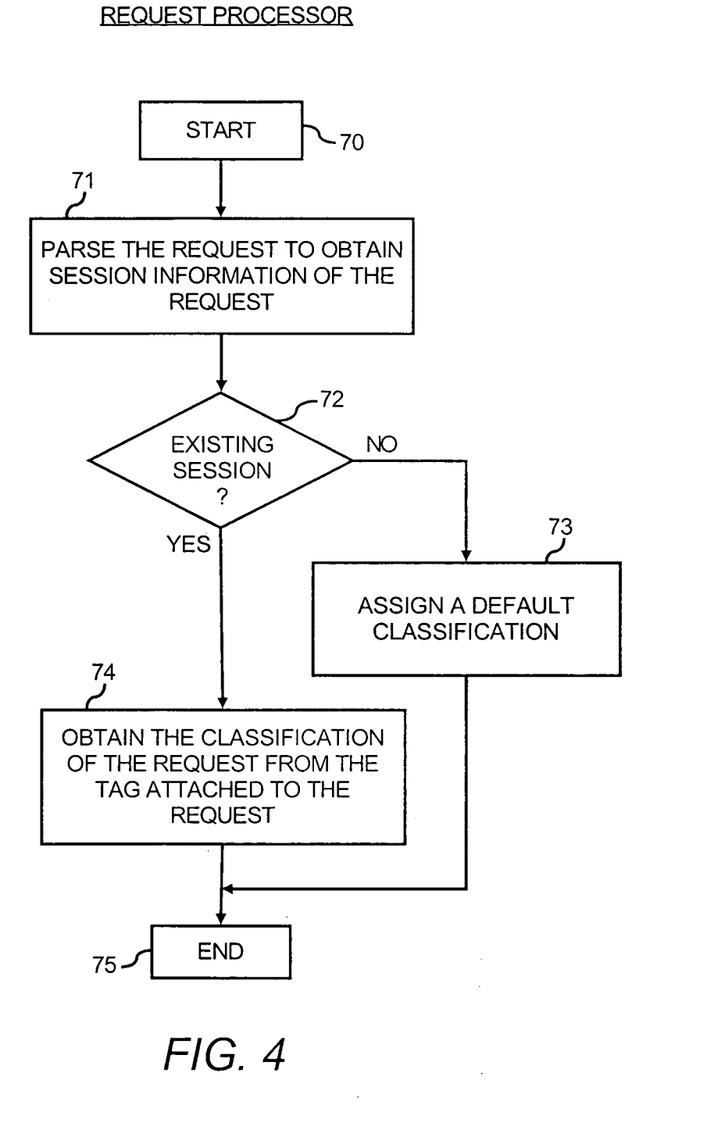
FIG. 4 is a flowchart diagram of the process of the request processor of FIG. 2.

Referring to FIG. 4, the request processing operation of the request processor 32 of the server system 31 of FIG. 2 starts at the step 70. Here, it is assumed that the request is already received in the request processor 32. At the step 71, the request processor 32 parses the request to obtain the session information of the request. The session information indicates whether the current request is for an existing session or not. Here, a session is defined as a series of accesses from a single user or client for a single task or transaction. The task or transaction can be performed by the application system 35 of FIG. 2. The task or transaction can also be completed by the server system 31 itself without the involvement of the application system 35. Thus, the term "session" and "transaction" are interchangeable in this description.

There are many ways to determine the session information of an access request. In one embodiment, the request processor 32 can extract the session information of the request from a cookie set within the request. The session information is extracted from the cookie. In another embodiment, the request processor 32 parses the request to determine if the request contains a tag. If so, the request is regarded as belonging to an existing session. If the request does not contain any tag, then it is regarded as a new session request.

At step 72, the request processor 32 determines if the session information of the request indicates that the request is for an existing session or not. If not, then the step 73 is performed, at which the request processor 32 assigns a default tag with a predetermined classification to the request. If, at the step 72, it is determined that the request belongs to an existing session, then the step 74 is performed. At the step 74, the request processor 32 obtains the classification information contained in the parsed tag from the request. The process then ends at the step 75.

Referring back to FIG. 2, the following description will focus on how the tag is generated. As described above, a request for an existing session or transaction contains a tag. The tag is, however, not generated in the requesting client system. In accordance with one embodiment of the present invention, the tag is generated in the application system 35 when it processes the first request for the session/transaction to which subsequent requests from the same client system are also accessing. This is based on the conclusion that the application system 35 is in the best position to indicate which of the user requests requesting services of the application system 35 should be assigned to a premium class or high priority and which of the user requests should be assigned to a low class or low priority. This is because the application system 35 handles the actual transaction requested by the user requests and have all the information required to make the determination. For example, the application system 35 knows whether an access request or user request comes from a user or client that has made a prior purchase. In addition, the application system 35 knows whether a request is part of a large volume transaction (if so, the request should be given high processing priority). Thus, the present invention implements the request classification function in the application system 35, not in the request processor 32. This can also be referred to as back-end classifcation.

This back-end classification means that when the requesting client system generates the first request for a session or transaction, the request does not contain any tag. When the first request is serviced by the data service system 30, the application system 35 of the data service system 30 starts the session or transaction requested. The application system 35 then determines the classification of the transaction (i.e., whether the transaction has a low, medium, or high scheduling priority). The application system 35 employs business rules stored in it to make the classification. For example, if the business rules categorize the transaction as a very important transaction, the application system 35 classifies the transaction as high priority transaction and generates the tag that contains the high priority classification information. The tag is then attached to the response to the first request and sent back to the requesting client that generated the first access request. When sending the subsequent requests for the same session or transaction, the requesting client attaches the tag to these subsequent requests for the same session or transaction. In one embodiment, the application system 35 also re-categorizes the classification when the subsequent requests are received and updates the tag if the classification for this transaction changes.

The application system 35 includes an application engine 38, a tag generator 36, and a business rule engine 37. The application engine 38 performs the main function of the application system 35. The application engine 38 interacts with the database 39 to perform the requested operation or transaction. The application engine 38 also interacts with the server module 33 to receive access requests and to send the responses to the requests back to the requesting clients via the server module 33 of the server system 31. Each response can be a text file or an executable program. The application engine 38 offers high-level abstractions for database accesses to the database 39. The high-level abstractions make it easier to write database access application software. Furthermore, the application engine 38 caches frequently accessed information from the database 39, thereby improving performance. Scalability, fault-tolerance, and session management are other capabilities that the application engine 38 offers. The structure of the application engine 38 is well known and is dependent on the type of application it implements. Thus the application engine 38 will not be described in more detail below.

The business rule engine 37 stores various business rules to classify various transactions. These business rules are configured by customers or administrators of the data service system 30 and stored in the business rule engine 37. The business rules include rules for tracking customers (e.g., whether the client or user is a repeat purchaser or a new purchaser, or whether the user or client has purchased goods for more than $500 last week), rules for dealing with user requests (e.g., raise the priority classification by one level if the cumulative purchase price of the current transaction is more than certain amount), and rules for conducting business transactions. The rules for conducting business transactions also include rules for offering discounts or sales. These business rules are used by the business rule engine 37 to categorize a transaction carried out by the application engine 38 such that a processing priority classification (e.g., low, medium, or high) can be assigned to the transaction. The business rule engine 37 analyzes the response to an access request in order to obtain the classification information. The business rule engine 37 employs the business rules stored to analyze the response.

The tag generator 36 is used to generate the tag that contains the classification information of the transaction. The tag generator 36 generates the tag and then attach it to the response to be sent to the requesting client. One way of attaching the tag to the response is to encode the tag into the URL of the response, or to put the tag into a cookie which is then attached to the response message. The response is then sent back to the requesting client or user via the server system 31. The tag generation operation of the tag generator 36 is shown in FIG. 3, which will be described in more detail below.

Figure 3:
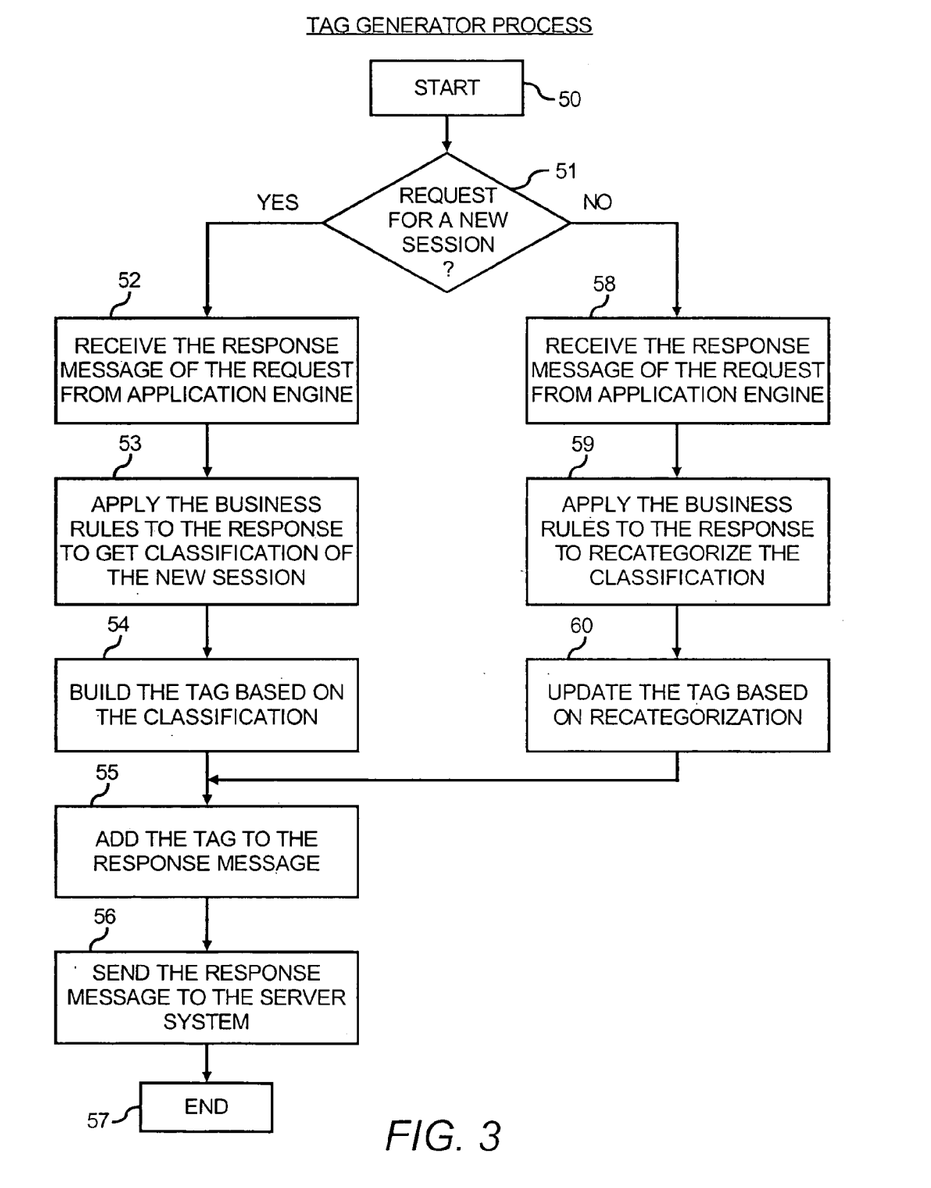
FIG. 3 is a flowchart diagram showing the process of the tag generator of FIG. 2.

Referring to FIG. 3, the tag generation operation starts at the step 50. At the step 51, the tag generator 36 determines whether the request is for a new session or not. This means that the tag generator 36 determines whether the request is for the existing transaction or a new transaction. As described above, this status information has already been obtained by the request processor 32 of the server system 31. The tag generator 36 can determine whether the request is for a new transaction by simply looking at the tag attached to the request. If the tag is the default tag, that means the request is for a new transaction or session. Otherwise, the request is for an existing session or transaction. Other means or methods can be used to determine the session information of the request.

If, at the step 51, the tag generator 36 determines that the request is for a new session, then the step 52 is performed, at which the tag generator 36 receives the response message from the application engine 38. At the step 53, the tag generator 36 causes the business rule engine 37 to apply the business rules stored to the response to obtain the classification of the new transaction or session. At the step 54, the tag generator 36 builds or generates the tag based on the classification information. At the step 55, the tag generator 36 attaches the tag to the response message. At the step 56, the tag generator 36 causes the response message with the attached tag to be sent to the server system 31. The process then ends at the step 57.

If, at the step 51, the tag generator 36 determines that the request is not for a new session (i.e., the transaction is an existing session), then the step 58 is performed, at which the tag generator 36 receives the response message from the application engine 38. At the step 59, the tag generator 36 causes the business rule engine 37 to apply the business rules to the response. This is to re-categorize the classification of the transaction. This is due to the fact that during the transaction, the requesting client may cause the characteristics of the transaction to be changed. For example, the requesting client may increase the purchase amount during the session, or the requesting client may select another more inexpensive item to purchase. Thus, it is beneficial to re-check the classification for each subsequent request.

At the step 60, the tag generator 36 updates the tag based on the re-categorization. This means that the tag generator 36 may either change the classification information contained in the tag or not change it, depending on the re-categorization. Then the steps 55–57 are performed. the tag generator 36 repeats this process when it receives the next request.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A data service system, comprising:
   a server system that includes a request processor configured to schedule requests from external clients for transactions to be serviced by the server system based on:
   (1) classification contained in a classification tag of those requests having such a tag, and
   (2) a default classification mechanism for those requests not having an associated classification tag; and
   an application system coupled to the server system, further including
      an application engine configured to perform a requested transaction scheduled by the server system and provide an associated transaction response to the server system for return to the requesting external client,
      a business rule engine configured to store business rules regarding classification of various transactions, and use the business rules to analyze at least some of the transaction responses; and
      a tag generator configured to generate a classification tag for a particular transaction in a session based on the analysis of its associated transaction response by the business rule engine,
   said system being configured to generate the classification tag to attach to its respective transaction response before it is returned to the requesting external client to be subsequently attached by that client to any succeeding requests in that session, the classification tag being newly generated in the application system to assign a classification per transaction for a first request, and the classification tag being updated to re-categorize the transaction during an existing session if the classification of a succeeding request is different than the classification of the first request.

2. The data service system of claim 1, wherein the tag generator causes the business rule engine to analyze the response with the business rules stored in the business rule engine to determine classification of the transaction such that subsequent requests that are part of the same transaction do not need to be classified again.

3. The data service system of claim 2, wherein the tag generator causes the business rule engine to selectively re-apply the business rules to responses to the subsequent requests to determine if reclassification is needed for the subsequent requests.

4. The data service system of claim 3, wherein the tag is updated if the tag generator determines that reclassification is needed.

5. The data service system of claim 1, wherein the server system attached the tag into the response by placing the tag (1) in a cookie, (2) in the body of the response message, or (3) in a URL of the response.

6. The data service system of claim 1, wherein when the server system receives a request, it parses the request to determine if the request is for an existing transaction or for a new transaction.

7. The data service system of claim 1, wherein the server system is a TCP/IP-based server application system.

8. The data service system of claim 7, wherein the server system is one of a web server system, an e-mail server system, a news server system, an e-commerce server system, a proxy server system, a domain name server system, and a local service server system.

9. In a data service system having an application system coupled to a server system, a method of classifying access requests, comprising:
   storing business rules regarding classification of responses to various externally requested transactions in a business rule engine;
   receiving an access request in the application system from the server system, wherein the access request is requesting the application system to perform an externally requested transaction and to generate a response for the request;
   using the business rules to analyze the response to obtain the classification information of the transaction response;
   generating a tag containing the classification information;
   sending the tag to a requesting client that issued the request such that the tag is attached to subsequent external requests to the data service system for the same transaction; and
   scheduling requests to be serviced by the server system based at least in part on the classification information contained in the tag of each of the subsequent external requests, said system being configured to newly generate the classification information to assign a classification for a first request, and to re-categorize the transaction during an existing session if the classification of a subsequent request is different than the classification of the first request.

10. The method of claim 9, wherein the step of scheduling requests further includes
parsing each of the requests to determine if the request is for an existing transaction or for a new transaction; and
if the request is for a new transaction, assigning a default tag to the request.

11. The method of claim 9, further comprising the step of re-applying the business rules to the responses of subsequent requests of an existing transaction to determine if reclassification is needed for the subsequent requests.

12. The method of claim 11, further comprising the step of updating the tag with new classification information if reclassification is needed.

13. The method of claim 9, wherein the step of sending the tag to a requesting client further comprises the step of attaching the tag into the response by placing the tag (1) in a cookie, (2) in the body of the response message, or (3) in a URL of the response.

14. A data service system, comprising:
a server system configured for receiving and handling requests from clients external to the data service system and including
a request processor configured for establishing a classification of each of the requests that is classified, scheduling the requests according to their respective classification, assigning a default classification to requests that are not classified, and
a server module configured for servicing the requests as scheduled;
an application system having an application engine configured for performing requested transactions in response to the scheduled requests, and providing responses to the scheduled requests about the requested transactions,
a business rule engine configured for storing business rules pertaining to transaction classifications, analyzing responses based on the business rules,
a tag generator configured for generating, and regenerating, transaction classifications for correspondingly attaching to the responses before they are returned to the clients, each transaction classification being associated with a particular session and being used with any subsequent requests within that session; and
a database configured to serve as a repository for the data service system and for interacting with the application system in relation to the requested transactions, a transaction classification being newly generated in the application system to assign a classification per transaction for a first request, and the transaction classification being updated to re-categorize the transaction during an existing session if the classification of a succeeding request is different than the classification of the first request.

15. A data service system as in claim 14 in which the application system is connected to the server system via a gateway interface or via a plug-in application configured to operate in the same processing domain as the server system.

16. A data service system as in claim 14 in which the server module contains
a server engine, and
a content generator configured to receive requests from the server engine and provide contents in response thereto, wherein the server engine determines if the requests are to be directed to the content generator or the application system.

17. A data service system as in claim 14 in which one or more of the requests received by the server system has a tag that holds a corresponding classification, wherein the response to each classified request with a tag has that tag and the response to each unclassified request has the default classification.

18. A data service system as in claim 14 in which the application system is further configured with a cache for holding frequently accessed information.

19. A data service system as in claim 14 in which the tag generator is configured to generate and regenerate the transaction classifications based on the analysis by the business rule engine which involves categorizing the requested transactions such that they are assigned a processing priority.

* * * * *